Nov. 3, 1953
R. K. CHAMBERLAIN
2,657,772
DISK BRAKE
Filed July 15, 1948
2 Sheets-Sheet 1
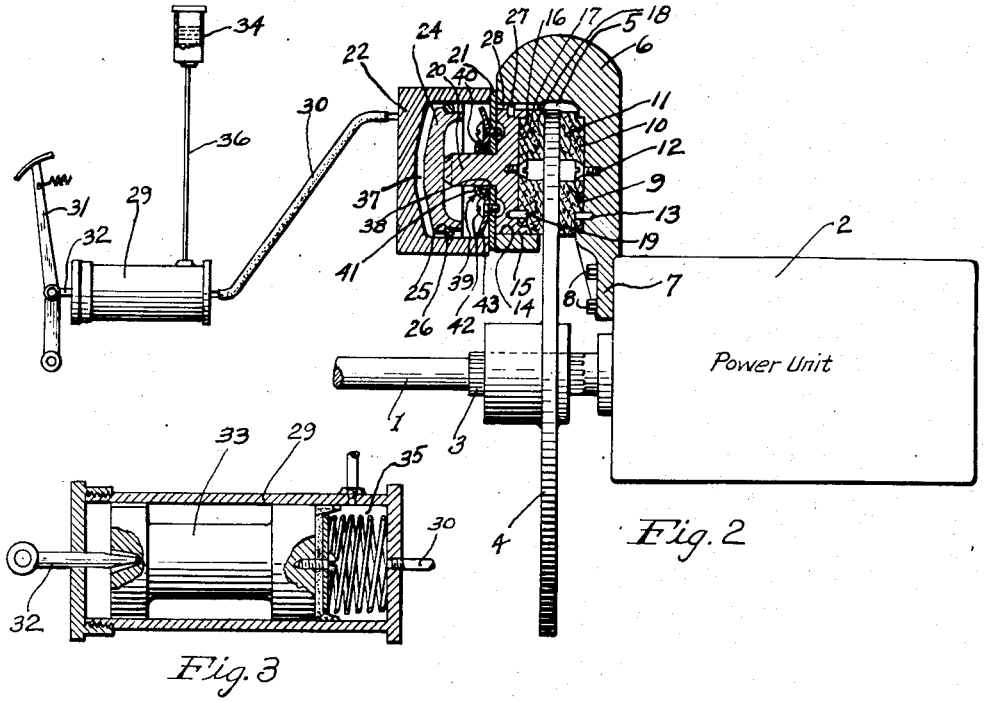
Fig. 2
Fig. 3
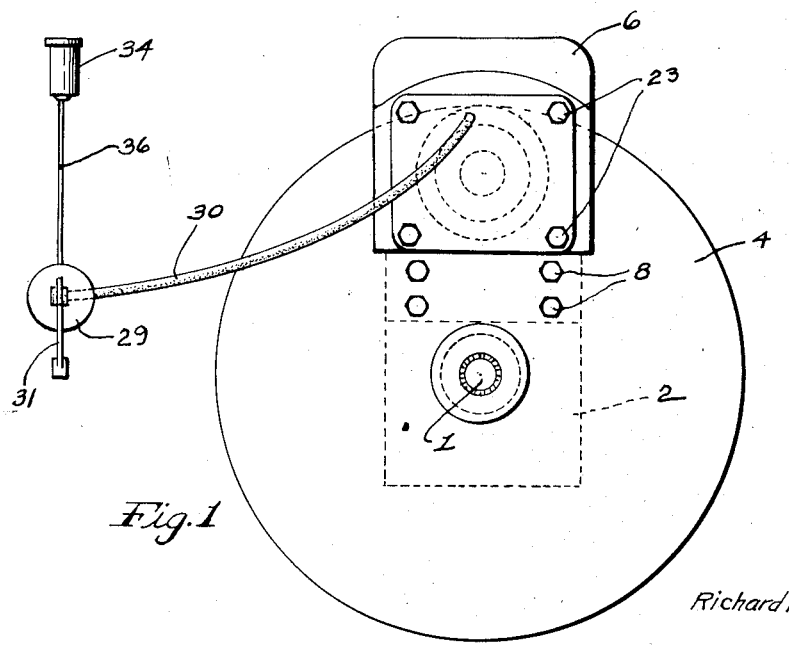
Fig. 1
Inventor
Richard K. Chamberlain
By
Attorney

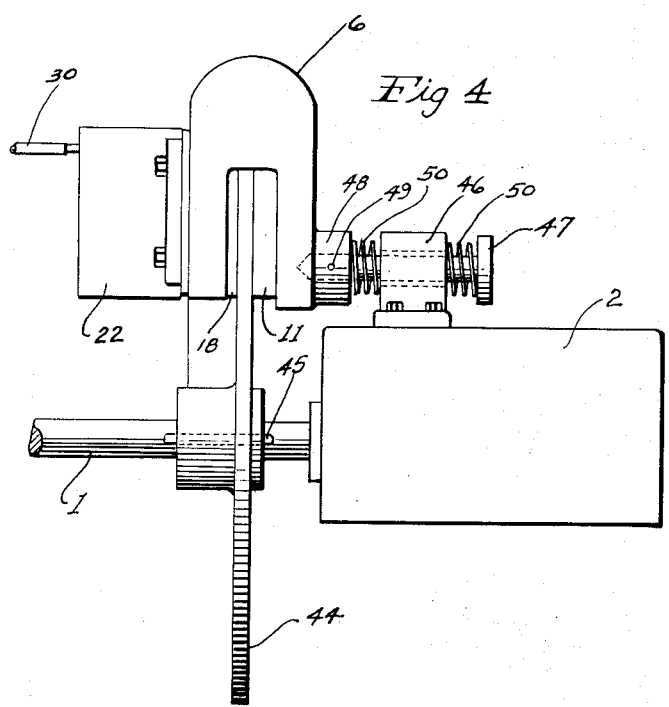
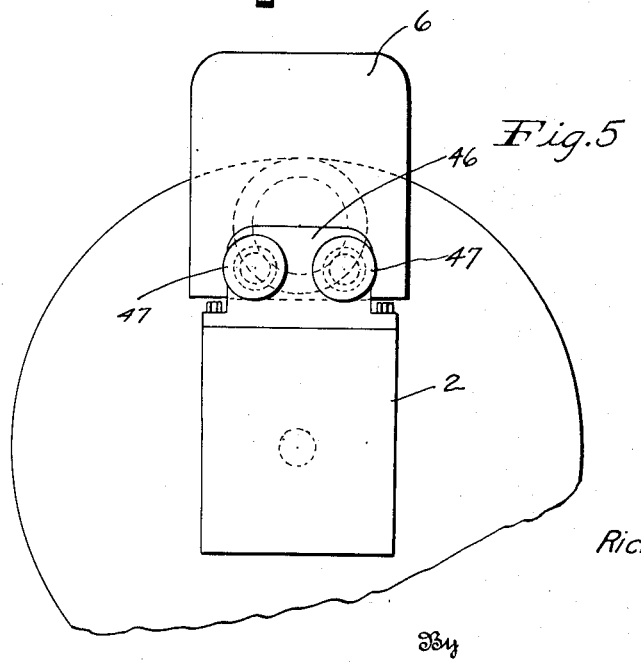

Patented Nov. 3, 1953

2,657,772

UNITED STATES PATENT OFFICE 2,657,772

DISK BRAKE

Richard K. Chamberlain, Akron, Ohio, assignor to Wingfoot Corporation, Akron, Ohio, a corporation of Delaware Application July 15, 1948, Serial No. 38,872

5 Claims. (Cl. 188—152)

1

The present invention relates to brakes and more particularly to a brake of the single disc spot type which may be employed on light or heavy vehicles or equipment where braking is necessary to bring moving parts to a quick and even stop.

It is an object of this invention to provide a braking unit suitable for a wide variety of uses where driven mechanism requires braking power to bring the moving parts to rest quickly and safely.

Another object of the invention is to provide a brake unit of compact form that may be readily applied to a driven shaft with efficiency, economy, and safety.

Another object is to provide a brake having incorporated therein a resilient member that will indicate a telltale warning when the composition friction members are worn to a point where they require replacement.

Another object of the invention is to provide a brake in which an auxiliary fluid pressure supply is provided to stabilize the braking element to prevent displacement thereof so that less effort is required of the actuating means.

The aforesaid objects of the invention and other objects which will become apparent as the description proceeds, are achieved by providing a compact braking unit comprising a single disc mounted on a driven shaft, the disc extending into a housing which has mounted therein friction members which are actuated to apply pressure on both sides of said disc to create a braking action to said driven shaft. The friction members are actuated by a plunger which transmits pressure when subjected to fluid pressure that is first supplied by a primary pressure cylinder which transmits pressure to a secondary pressure cylinder into which said plunger extends.

For a better understanding of the invention, reference should be had to the accompanying drawings, wherein:

Figure 1 is an end view of the braking unit;

Figure 2 is a sectional view taken on the line 1—1 of Figure 1;

Figure 3 is a sectional view of the primary pressure cylinder;

Figure 4 is an elevation of a modified form of mounting of the unit;

Figure 5 is an end view of the unit shown in Figure 4.

With specific reference to the form of the invention illustrated in the drawings, in Figures 1 to 3, the numeral 1 indicates a shaft driven by a power unit 2. The shaft 1 is provided with splines 3 on which is slidably mounted a braking disc 4 similarly splined which extends into an opening 5 in a housing 6 which is in the general form of a C clamp.

The housing is provided with an extending lug 7 to serve as a means for attachment to the power unit 2 or any other support by the cap screws 8. Although the brake unit is illustrated as being attached to a power unit, it may also be cooperatively applied to a driven shaft by providing an adapter body which may take various forms to accommodate various conditions where a brake of this type is required.

A recess 9 in one wall of the housing 6 receives a reduced portion 10 of a friction member 11 in the form of a disc which is secured therein by a screw 12. Rotation of the friction member 11 is prevented by a dowel pin 13 projecting from the recess 9.

The opposite wall of the housing 6 is provided with a bore 14 which receives a plunger 15, the end of which is provided with a recess 16 to receive the reduced portion 17 of another friction member or disc 18 which is held against rotation by a dowel pin 19 extending from said recess.

The friction members or discs 11 and 18 are mounted in opposed spaced apart relationship to permit the brake disc 4 to be interposed therebetween so that when pressure is applied the friction members 11 and 18 will be in frictional contact with said disc on opposite sides thereof. The friction members may be composed of one of a number of friction compositions used for brakes.

The plunger 15 has extending therefrom a stem 20 which extends through a plate 21 into a cylinder 22 which is attached to the housing 6 by cap screws 23, the plate 21 being clamped therebetween. Within the cylinder 22, a piston 24 is provided with a groove 25 formed in its circumference to receive a sealing ring 26 to prevent passage of the pressure fluid past the piston. The plunger is prevented from revolving by a key 27 extending from the circumferential surface of the plunger and projecting into a keyway 28 in said housing.

The fluid pressure is supplied by a conventional pressure cylinder 29 connected to the cylinder 22 by a flexible conductor 30 to exert pressure on the piston 24 within the cylinder 22, the pressure being applied by a foot pedal 31 attached to the push rod 32 to actuate the piston 33 within the cylinder 29.

A feature of the fluid pressure system is a partially filled auxiliary fluid container 34 which serves as a fluid reservoir, and which is connected to the fluid chamber 35 of the cylinder 29 by a tube or pipe 36. The fluid container 34 is mounted so that it is above the highest point in the fluid system, which in the present case is the fluid chamber 37 in the cylinder 22, the auxiliary fluid container being elevated to a height that a head of fluid will exert from 3 to 5 ounces of pressure against the brake disc 4 by the axially movable friction member 18. This will keep the friction members 11 and 18 in light contact with the brake disc 4 at all times, keeping said disc in line and preventing it from oscillating on the splined shaft 1, preventing vibration and the hazard of binding. The pressure exerted by the auxiliary container is slight and no appreciable wear on the friction members or brake disc will result by keeping the friction members in slight contact with the brake disc. The auxiliary fluid also prevents air from entering the fluid system. Alternatively, instead of having the container 34 elevated, pressure can be maintained in the container by a plunger backed up by a light spring.

Another advantage in keeping the friction discs in slight contact with the brake disc is that the brake pedal will travel a less distance when fluid pressure is applied, reducing the reciprocating movement of the piston 33 and plunger 15 to a minimum, preventing undue wear on the moving parts, all of which will reduce maintenance and provide a more trouble-free braking unit.

The plate 21 clamped between the housing 6 and the cylinder 22 serves as a seal and backing for the plunger 15 and has an opening 38 therein through which the plunger stem 20 extends to contact the piston 24. To prevent dust, dirt or moisture from entering the piston cylinder 22, a stuffing box 39 is provided to seal the opening 38. The stuffing box consists of a packing ring 40 clamped about the opening by a packing gland 41 attached to said plate 21 by screws 42. The packing gland, formed of relatively light gage resilient metal, is of circular form having a bulge in the central portion to retain the packing ring. The outer rim, or ring spring portion 43 of the packing gland 41 is flared, resembling the rim of a saucer to serve as a telltale stop spring to indicate when the friction members are worn to such an extent that replacement is necessary. The spring gland is disposed in the pressure cylinder 22 in opposed relationship to the forward movement of the piston 24. As the friction members wear, the distance between the piston and the ring spring 43 becomes gradually less until the piston contacts the spring 43 formed on the outer edge of the gland 39. The contact is indicated by the pressure required on the foot pedal 31. When this contact is made, appreciably greater pressure on the pedal is required of the operator to overcome the resistance of the spring. When the spring resistance is encountered, as indicated by the feel and pressure of the operator's foot, and the spring yields to pressure, it serves as a telltale warning that the friction members need replacement before they are entirely worn out, thus preventing sudden failure or scouring of the brake disc.

When the spring 43 has become fully compressed, the piston 24 has reached the limit of its movement. The braking pressure is confined to the reaction of the spring which is insufficient for effective braking action.

As shown in Figures 4 and 5, the braking unit may be provided with a resilient mounting to permit relative axial movement with respect to the driven brake disc 44 which is mounted in a fixed position on the drive shaft 1 by a key 45. This is accomplished by providing a bearing bracket 46 which may be attached to the power unit or to a stand or bracket especially provided therefor. Guide rods 47 slidably mounted in the bearing bracket 46 extend into bosses 48 formed on the housing and are secured therein by pins 49. Springs 50 positioned on the rods 47 hold the brake housing 6 in its normal neutral balanced position when the brake is not applied, but permits relative axial movement with respect to the brake disc 44 to permit the friction members 11 and 18 to come into pressed frictional engagement therewith when the braking pressure is applied.

It is understood that where reference has been made to a driven member, this term is applicable to any rotatable member whether it is power driven directly or by some other force, for example that force which drives the axle of a wheel which in turn is driven by contact with the track or surface over which it travels.

From the foregoing description, it will be apparent that the present invention provides a braking unit that may be employed on light and heavy vehicles, railroad cars, or on industrial machinery where braking power is required, a brake which will be economical to manufacture and install, will be efficient and safe requiring a minimum of maintenance and may be operated by a minimum of effort.

It will be recognized that the objects of this invention have been achieved by providing means to keep the braking parts in alignment and telltale means to warn the operator of the worn condition of the brakes before they have reached the danger point, so that impending disaster or damage may be avoided.

I claim:

1. A disc brake comprising a driven shaft, a revolving disc slidably mounted on said shaft, a housing, a fluid pressure cylinder, a sealing plate disposed between said housing and said cylinder, friction members disposed in said housing on either side of said disc, one of said friction members being secured to a wall of said housing, a plunger head secured to and supporting the other of said friction members, a stem extending from said plunger head through said sealing plate into said cylinder, a stuffing box including a packing gland attached to said sealing plate to prevent fluid from contacting said friction members and said disc, and a piston disposed in said cylinder to actuate said plunger, said gland having a flared outer circumference to serve as a yieldable stop for said piston at a predetermined point of the piston travel to serve as a warning when the friction members need replacement.

2. A disc brake of the spot type comprising a driven shaft, a disc slidably mounted thereon, a housing into which said disc extends, a friction disc rigidly mounted in a wall of said housing, a plunger disposed in said housing, a friction disc rigidly mounted on said plunger, said first mentioned disc being disposed between said friction discs, a backing plate having an opening therein, a stem extending from said plunger through the opening in the backing plate, a fluid seal around said plunger stem, a gland associated with said seal, said gland being flared about its outer edge to form a spring, a cylinder attached to said housing, and a piston within said cylinder.

3. A disc brake of the spot type comprising a driven shaft, a disc slidably mounted thereon and rotatable therewith, a housing, a plunger slidably mounted in said housing, a friction member rigidly secured to said plunger, a stem extending from said plunger, a sealing and backing plate having an opening therein to receive said plunger stem, a stuffing box to seal said opening about the plunger stem, a gland associated with said stuffing box, said gland having a flared edge about its circumference to form a spring limiting stop for the plunger, a cylinder attached to said housing, and a piston within said cylinder.

4. A braking device including a friction element mounted for reciprocating movement, fluid pressure means for applying braking pressure to said friction element to move it in one direction for braking purposes, and ring spring means positioned adjacent said friction element in operative relation with said friction element to be flattened by movement thereof only after a predetermined amount of wear of the friction element has occurred for indicating that the travel of the friction element is excessive due to wear thereof.

5. A braking device including a friction element mounted for reciprocating movement, means for applying braking pressure to said element to move it in one direction for braking purposes, and resilient compression type stop means operatively associated with said friction element to be contacted by said pressure means for noticeably restricting movement of said friction element by said pressure means after a predetermined amount of movement of said friction element until a special supplemental pressure is applied to said pressure means to compress the stop means for indicating that the travel of said friction element is excessive due to wear of said friction element.

RICHARD K. CHAMBERLAIN.

References Cited in the file of this patent
UNITED STATES PATENTS

| Number | Name | Date |
|---|---|---|
| 966,722 | Weight | Aug. 9, 1910 |
| 1,564,701 | Mattingly | Dec. 8, 1925 |
| 1,755,829 | Loughead | Apr. 22, 1930 |
| 1,806,151 | Dick | May 19, 1931 |
| 1,951,597 | Dale | Mar. 20, 1934 |
| 2,152,067 | La Brie | Mar. 28, 1939 |
| 2,156,415 | Weihe | May 2, 1939 |
| 2,197,126 | Dick | Apr. 16, 1940 |
| 2,236,346 | Mossinghoff | Mar. 25, 1941 |
| 2,351,041 | Hawley | June 13, 1944 |
| 2,371,554 | Scott-Iversen | Mar. 13, 1945 |
| 2,392,970 | Bricker | Jan. 15, 1946 |
| 2,419,113 | Bricker | Apr. 15, 1947 |
| 2,474,990 | Slatin | July 5, 1949 |
| 2,485,086 | Cagle | Oct. 18, 1949 |